(12) United States Patent
Sun et al.

(10) Patent No.: US 8,341,493 B2
(45) Date of Patent: Dec. 25, 2012

(54) CONTROL CHANNEL DETECTION FOR MULTIPLE IMPLICIT IDENTIFIERS

(75) Inventors: Li-Hsiang Sun, San Diego, CA (US); Dongwook Roh, San Diego, CA (US)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 12/649,082

(22) Filed: Dec. 29, 2009

(65) Prior Publication Data
US 2010/0169751 A1      Jul. 1, 2010

Related U.S. Application Data

(60) Provisional application No. 61/141,194, filed on Dec. 29, 2008.

(51) Int. Cl.
*G06F 11/00*      (2006.01)
(52) U.S. Cl. ............... 714/758; 455/440; 455/456.6
(58) Field of Classification Search .......... None
See application file for complete search history.

(56) References Cited

U.S. PATENT DOCUMENTS

| | | | |
|---|---|---|---|
| 6,552,661 B1* | 4/2003 | Lastinger et al. | 340/572.1 |
| 7,171,329 B2* | 1/2007 | Rodman et al. | 702/150 |
| 7,376,098 B2 | 5/2008 | Loeffler et al. | |
| 2004/0002348 A1 | 1/2004 | Fraccaroli | |
| 2005/0181810 A1 | 8/2005 | Camp, Jr. et al. | |
| 2010/0203866 A1* | 8/2010 | Li et al. | 455/411 |
| 2011/0004796 A1* | 1/2011 | Hsuan et al. | 714/748 |
| 2011/0170509 A1* | 7/2011 | Naka et al. | 370/329 |

\* cited by examiner

*Primary Examiner* — Christopher McCarthy
(74) *Attorney, Agent, or Firm* — Lee, Hong, Degerman, Kang & Waimey

(57) ABSTRACT

A method for identifying matched mobile stations includes receiving by a first mobile station signals from a plurality of mobile stations located within a threshold distance of the first mobile station, identifying a first group of mobile stations of the plurality of mobile stations, and receiving uni-cast control information from a network entity. For each mobile station of a first group, the method includes identifying a matched mobile station based upon first data of a mobile station of the first group effectively matching second data of a mobile station of a second group. One operation includes generating a descrambled information element for each matched mobile station of the first group by using the first scrambling sequence that is associated with the matched mobile station to descramble the scrambled information element of the mobile terminal of the second group that is matched to the mobile terminal of the first group.

12 Claims, 7 Drawing Sheets

CONTROL CHANNEL DETECTION FOR MULTIPLE IMPLICIT IDENTIFIERS

CROSS-REFERENCE TO RELATED APPLICATIONS

Pursuant to 35 U.S.C. §119(e), this application claims the benefit of earlier filing date and right of priority to Provisional Application No. 61/141,194, filed on Dec. 29, 2008, the contents of which are incorporated by reference herein in their entirety.

FIELD OF THE INVENTION

The present invention relates to wireless communications, and in particular, to wireless communication techniques.

DESCRIPTION OF THE RELATED ART

In a cellular system, a base station (BS) or a relay station (RS) transmits control information to one or more mobile stations (MSs) or sub-ordinate RSs. Generally, an MS may have to monitor multiple identifiers (IDs), such as a broadcast ID, a unicast ID, and a multicast ID.

For example, an MS may need to monitor the control information of other MSs in certain situations, such as when performing network coding techniques. As another example, an RS may need to monitor multiple IDs, such as the ID of each of the MSs in communication with the RS.

Access link network coding is one type of network coding technique where a transmitter transmits a network coded packet to a parent station and to one or more MSs. Access link network coding usually requires an MS to receive the uplink (UL) resource assignments of neighboring MSs which may be provided by an RS, for example. Moreover, access link network coding usually requires an MS to know the Mobile Station Group (MSG) report assignments of other MSs, where an MSG report is a report sent from an MS to its parent station describing MSs that are nearby the MS. As such, the MS may be required to monitor UL scheduling assignments to other MSs.

Typically, a BS does not explicitly transmit the ID of an MS (hereinafter referred to as an "MS ID") with the control channel block because the BS applies, for example, MS ID-specific scrambling or masking to the control information or the cyclic redundancy code (CRC). Consequently, when an MS or RS is required to monitor multiple IDs, the MS or RS may be required to iteratively perform several descrambling operations and CRC calculations in order to determine which MS IDs are scheduled.

SUMMARY

In various embodiments, a method for identifying matched mobile stations includes receiving by a first mobile station signals from a plurality of mobile stations located within a threshold distance of the first mobile station, identifying a first group of mobile stations of the plurality of mobile stations, the first group being those mobile stations that meet a threshold requirement; and receiving uni-cast control information from a network entity, wherein the uni-cast control information comprises scheduling information for a second group of mobile stations, and wherein the scheduling information for each mobile station of the second group comprises a scrambled information element and a scrambled cyclic redundancy check (CRC), wherein each mobile station of the second group is a candidate for matching to a mobile station of the first group. For each mobile station of the first group, the method further includes identifying a first scrambling sequence to be applied to an information element of an associated mobile station and a second scrambling sequence to be applied to a CRC of the associated mobile station, and obtaining first data by performing a CRC on the first scrambling sequence, which is then effectively logically XOR-ed to the second scrambling sequence. In addition, for each mobile station of the second group, the method includes obtaining second data by performing a CRC on the scrambled information element, which is then effectively logically XOR-ed to the scrambled CRC. Further, for each mobile station of the first group, the method includes identifying a matched mobile station based upon the first data of a mobile station of the first group effectively matching the second data of a mobile station of the second group. One operation includes generating a descrambled information element for each matched mobile station of the first group by using the first scrambling sequence that is associated with the matched mobile station to descramble the scrambled information element of the mobile terminal of the second group that is matched to the mobile terminal of the first group. Alternative embodiments include a mobile station being configured to function using, for example, the foregoing operations.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be presented herein in the context of a wireless communication network and associated entities configured in accordance with the IEEE 802.16 standards family commonly referred to as WiMAX. However, alternatives to such implementations are envisioned and teachings with regard to the WiMAX standard are generally applicable to other standards and air interfaces as well. Moreover, the use of certain terms to describe various embodiments should not limit such embodiments to a certain type of wireless communication system, such as WiMAX. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), and universal mobile telecommunications system (UMTS), the long term evolution (LTE) of the UMTS, and the global system for mobile communications (GSM). By way of non-limiting example only, further description will relate to a WiMAX communication system, but such teachings apply also to other system types.

Figure 1:
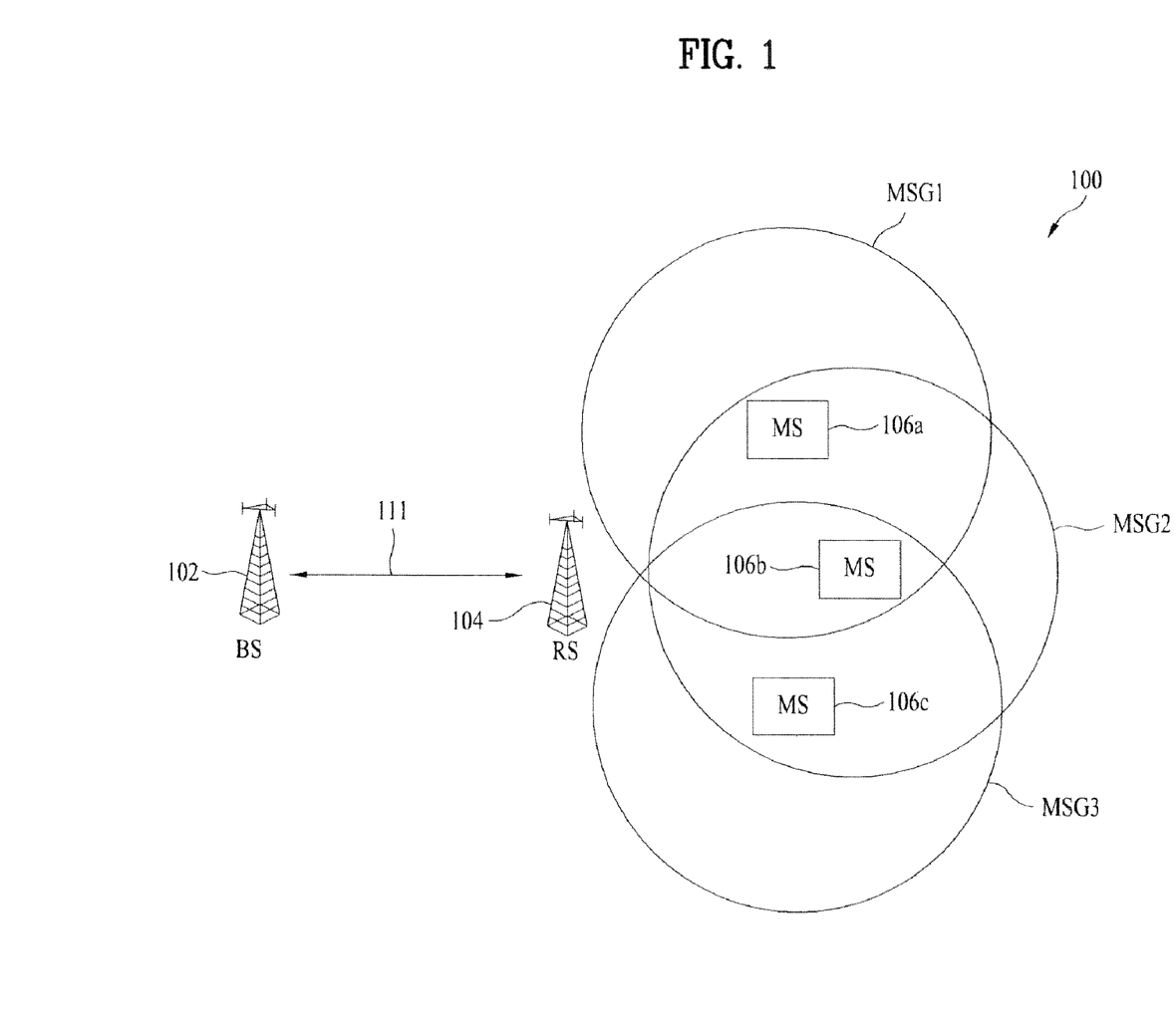
FIG. 1 illustrates an exemplary communication system in accordance with various embodiments of the invention.

FIG. 1 illustrates an exemplary communication system 100 in accordance with various embodiments of the invention.

As shown in FIG. 1, the communication system 100 includes a base station (BS) 102, a relay station (RS) 104, and mobile stations (MSs) 106a, 106b, and 106c. The BS 102 can communicate with the RS 104 via signal 111. Each MS in the communication system 100 can communicate with the BS 102 via the RS 104. The MS groups MSG1, MSG2, and MSG3 will be described in more detail in conjunction with later figures.

Figure 2:
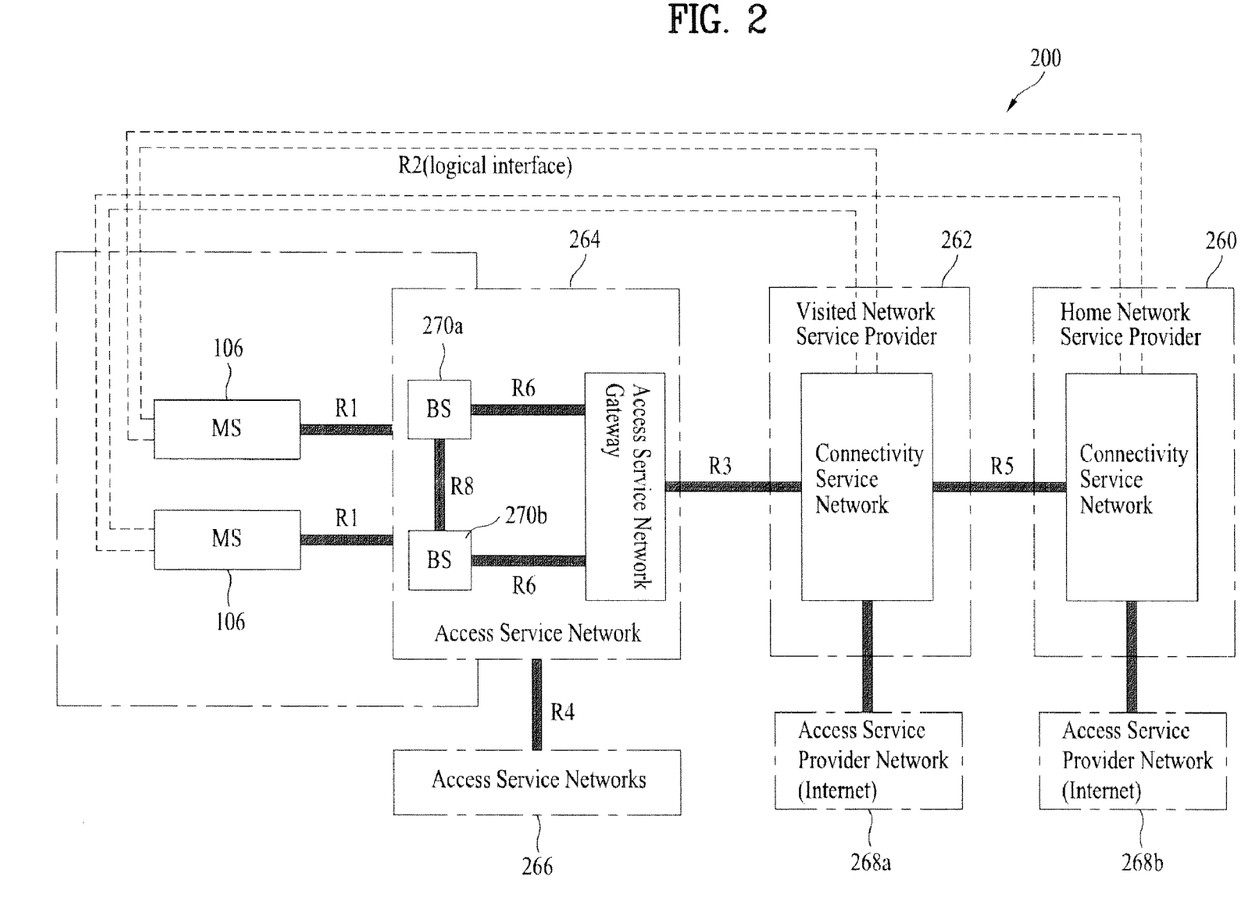
FIG. 2 is a block diagram of an exemplary communication network in accordance with various embodiments of the present invention.

FIG. 2 is a block diagram of an exemplary communication network in accordance with various embodiments of the present invention. In this figure, communication network 200 includes a home network service provider ("home NSP") 260, a visited network service provider ("visited NSP") 262, an access service network (ASN) 264, access service networks 266, access service provider networks 268a and 268b. MSs 106 are separately shown in communication with respective serving BSs 270a, 270b. In some embodiments, the BSs 270a, 270b, are implemented in a manner similar to that of the BSs of FIG. 1.

A network service provider, such as home NSP 260 or visited NSP 262, may include a business entity that provides IP connectivity and WiMAX services to WiMAX subscribers compliant with the service level agreement it establishes with WiMAX subscribers. A technique for providing these services includes the NSP establishing an agreement with one or more network access providers, which are commonly implemented as business entities providing WiMAX radio access infrastructure to one or more WiMAX network service providers.

ASN 264 typically includes a logical boundary and represents an aggregation of functional entities and corresponding message flows associated with the access services. ASN 264 often includes a boundary for functional interoperability with WiMAX clients, WiMAX connectivity service functions, and aggregation of functions embodied by different vendors, for example.

In FIG. 2, ASN 264 is shown sharing R1 reference point (RP) with MSs 106, R3 RP with a connectivity service network (CSN) of visited NSP 262, and a R4 RP with ASN 266. ASN 264 typically includes one or more base stations and one or more instances of an ASN gateway (ASN-GW). The R4 reference point is typically implemented for control and bearer planes for interoperability between similar or heterogeneous ASNs. Interoperability between various types of ASNs may be accomplished using the specified protocols and primitives exposed across R1, R3 and R4 reference points.

In some embodiments, the depicted base stations are entities that embody a full instance of the WiMAX media access control (MAC) and physical (PHY) layers in compliance with the relevant transmission protocol. In the embodiment of FIG. 2, these base stations may be configured to function or otherwise implement the IEEE 802.16 suite of applicable standards, and may host one or more access functions. In some scenarios, the base stations each represent one sector with one frequency assignment and incorporates scheduler functions for both uplink and downlink resources.

Connectivity (e.g., reachability) of BSs 270a, 270b to more than one ASN-GW may be required or desired to facilitate load balancing, redundancy, and the like. Note that each BS 270a and/or 270b is a logical entity, and a physical implementation of such logical entities may implement one or more base stations.

Reference point R1 typically includes protocols and procedures to facilitate communication between MS 106 and ASN 264. If desired, reference point R1 may also include additional protocols related to the management plane.

Reference point R2 generally includes protocols and procedures to facilitate communication between MS 110 and one or more CSNs. Reference point R2 is shown as a logical interface such that it does not reflect a direct protocol interface between a MS and the CSN.

The authentication part of reference point R2 is shown between MSs 106 and the CSN of home NSP 260. However the ASN and CSN of visited NSP 262 may partially or completely process the aforementioned procedures and mechanisms. Reference point R2 may also support IP host configuration management between the MSs 110 and the CSN (of either the home NSP 260 or the visited NSP 262).

Reference point R3 often includes a set of control plane protocols between ASN 264 and the CSN to support authentication, authorization, accounting (AAA), and the like, associated with a user (e.g., MS 106), and subscribed services across different access technologies. For example, AAA may include mechanisms for secure exchange and distribution of authentication credentials and session keys for data encryption.

Reference point R4 often includes a set of control and bearer plane protocols originating/terminating in various functional entities of an ASN that coordinate the mobility of MSs 106 between ASNs and ASN-GWs. In some scenarios, R4 is the only interoperable RP between similar or heterogeneous ASNs.

Reference point R5 may include a set of control plane and bearer plane protocols for internetworking between the CSN of the home NSP 260 and may be operated by the visited NSP 262.

The ASN gateway (ASN-GW) in ASN 264 is shown as a logical entity that represents an aggregation of control plane functional entities that are either paired with a corresponding function in the ASN (e.g., a BS instance), a resident function in the CSN, or a function in another ASN, such as ASN 266. The ASN-GW may also perform bearer plane routing or bridging function. ASN-GW implementation may include redundancy and load-balancing among several ASN-GWs.

In some embodiments, for each MS 106, a base station may be associated with only one default ASN GW. However, other embodiments permit ASN-GW functions for each MS to be distributed among multiple ASN-GWs located in one or more ASNs.

Reference point R6 generally includes a set of control and bearer plane protocols for communication between the BSs 270a and 270b and the ASN-GW. The bearer plane usually includes an intra-ASN data path between each of the BSs

270a and 270b and the ASN gateway. The control plane may include protocols for data path establishment, modification, and release control in accordance with the MS mobility events.

Reference point R7 may include an optional set of control plane protocols (e.g., for AAA and policy coordination in the ASN gateway), as well as other protocols for coordination between the various groups of functions identified in the reference point R6.

The decomposition of the ASN functions using the R7 protocols is optional.

Reference point R8 may include a set of control plane message flows and optionally bearer plane data flows between BSs 270a and 270b to facilitate handover. The bearer plane often includes protocols that allow the data transfer between BSs involved in handover of a certain MS, such as MSs 106. The control plane may include an inter-BS communication protocol and additional set of protocols that allow controlling of the data transfer between the BSs involved in handover of a certain MS.

In some embodiments, communication network 200 may include relay stations to provide improved coverage and/or capacity by establishing Layer-3 (L3) connectivity with an MS configured to communicate using a desired protocol (e.g., IEEE 802.16e, IEEE 802.16m, and the like).

Figure 3:
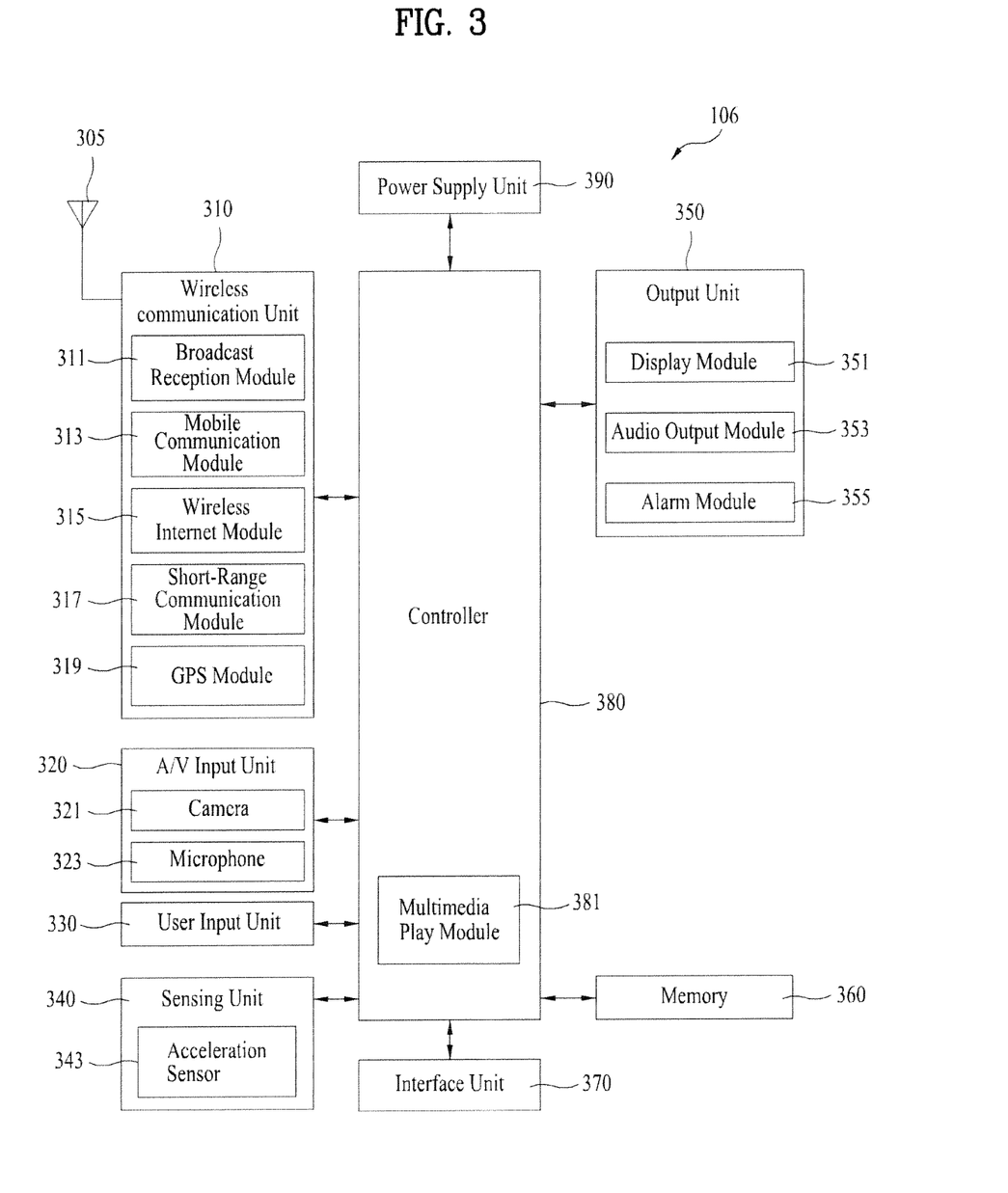
FIG. 3 is a block diagram showing in more detail various components which may be implemented in a mobile station according to various embodiment of the present invention.

FIG. 3 is a block diagram showing in more detail various components which may be implemented in an MS 106 according to various embodiment of the present invention. The MS 106 corresponds to the MSs 106a through 106c described herein. It is understood that greater or fewer components than those shown may be implemented.

Referring to FIG. 3, the MS 106 may include a wireless communication unit 310, an audio/video (A/V) input unit 320, a user input unit 330, a sensing unit 340, an output unit 350, a memory 360, an interface unit 370, a controller 380, and a power supply unit 390. Two or more of the wireless communication unit 310, the A/V input unit 320, the user input unit 330, the sensing unit 340, the output unit 350, the memory 360, the interface unit 370, the controller 380, and the power supply unit 390 may be incorporated into a single unit, or some of the wireless communication unit 310, the A/V input unit 320, the user input unit 330, the sensing unit 340, the output unit 350, the memory 360, the interface unit 370, the controller 380, and the power supply unit 390 may be divided into two or more smaller units.

The wireless communication unit 310 may include a broadcast reception module 311, a mobile communication module 313, a wireless Internet module 315, a short-range communication module 317, and a GPS module 319.

The broadcast reception module 311 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to MS 106 through a mobile communication network. In this case, the broadcast-related information may be received by the mobile communication module 313, rather than by the broadcast reception module 311. The broadcast-related information may come in various forms, for example, electronic program guide (EPG) of digital multimedia broadcasting (DMB) or electronic service guide (ESG) of digital video broadcast-handheld (DVB-H).

Broadcast reception module 311 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 311 may be configured to be suitable for nearly all types of broadcasting systems other than those set forth herein.

The broadcast signal and/or the broadcast-related information received by the broadcast reception module 311 may be stored in memory 360.

The mobile communication module 313 transmits wireless signals to or receives wireless signals from at least one or more of a base station, an external station, a relay station, and a server through a mobile communication network. The wireless signals may include various types of data according to whether the MS 106 transmits/receives voice call signals, video call signals, or text/multimedia messages.

The wireless Internet module 315 may be a module for wirelessly accessing the Internet. The wireless Internet module 315 may be embedded in the MS 106 or may be installed in an external device.

The short-range communication module 317 may be a module for short-range communication. The short-range communication module 317 may use various short-range communication techniques such as Bluetooth®, radio frequency identification (RFID), infrared data association (IrDA), ultra wideband (UWB), and ZigBee®.

The GPS module 319 may receive position information from one or more satellites (e.g., GPS satellites).

The A/V input unit 320 may be used to receive audio signals or video signals. The A/V input unit 320 may include one or more cameras 321 and a microphone 323. The camera 321 processes various image frames such as still images or moving images captured by an image sensor during a video call mode or an image capturing mode. The image frames processed by the camera 321 may be displayed by a display module 351.

The image frames processed by the camera 321 may be stored in the memory 360 or may be transmitted outside the MS 106 through the wireless communication unit 310. The MS 106 may include more than two cameras.

The microphone 323 receives external sound signals during a call mode, a recording mode, or a voice recognition mode with the use of a microphone and converts the sound signals into electrical sound data. In the call mode, the mobile communication module 313 may convert the electrical sound data into data that can be readily transmitted to a mobile communication base station and then output the data obtained by the conversion. The microphone 323 may use various noise removal algorithms to remove noise that may be generated during the reception of external sound signals.

The user input unit 330 generates key input data based on user input for controlling the operation of the MS 106. The user input unit 330 may be implemented as a keypad, a dome switch, a touch pad (either static pressure or constant electricity), a jog wheel, or a jog switch. In particular, if the user input unit 330 is implemented as a touch pad and forms a mutual layer structure along with the display module 351, the user input unit 330 and the display module 351 may be collectively referred to as a touch screen.

The sensing unit 340 determines a current state of the MS 106 such as whether the MS 106 is opened or closed, the position of the MS 106 and whether the MS 106 is placed in contact with a user. In addition, the sensing unit 340 generates a sensing signal for controlling the operation of the MS 106.

For example, when the MS 106 is a slider-type mobile phone, the sensing unit 340 may determine whether the MS 106 is opened or closed. In addition, the sensing unit 340 may determine whether the MS 106 is powered by the power supply unit 390 and whether the interface unit 370 is connected to an external device.

The sensing unit 340 may include an acceleration sensor 343. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 343 representing different axial directions may be installed in the MS 106. Alternatively, only one acceleration sensor 343 representing a Z axis may be installed in the MS 106.

The output unit 350 may output audio signals, video signals, and alarm signals. The output unit 350 may include the display module 351, an audio output module 353, and an alarm module 355.

The display module 351 may display various information processed by the MS 106. For example, if the MS 106 is in a call mode, the display module 351 may display a user interface (UI) or a graphical user interface (GUI) for making or receiving a call. If the MS 106 is in a video call mode or an image capturing mode, the display module 351 may display a UI or a GUI for capturing or receiving images.

If the display module 351 and the user input unit 330 form a mutual layer structure and are thus implemented as a touch screen, the display module 351 may be used not only as an output device but also as an input device. If the display module 351 is implemented as a touch screen, the display module 351 may also include a touch screen panel and a touch screen panel controller.

The touch screen panel is a transparent panel attached onto the exterior of the MS 106 and may be connected to an internal bus of the MS 106. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 380. The control unit 380 then determines whether a touch input has been generated and which part of the touch screen panel has been touched based on the processed signals transmitted by the touch screen panel controller.

As described above, if the display module 351 and the user input unit 330 form a mutual layer structure and are thus implemented as a touch screen, the display module 351 may be used not only as an output device but also as an input device. The display module 351 may include at least one of a liquid crystal display (LCD), a thin film transistor (TFT)-LCD, an organic light-emitting diode (OLED), a flexible display, and a three-dimensional (3D) display.

The MS 106 may include two or more display modules 351. For example, the MS 106 may include an external display module and an internal display module.

The audio output module 353 may output audio data received by the wireless communication unit 310 during a call reception mode, a call mode, a recording mode, a voice recognition mode, or a broadcast reception mode or may output audio data present in the memory 360. In addition, the audio output module 353 may output various sound signals associated with the functions of the MS 106 such as receiving a call or a message. The audio output module 353 may include a speaker and a buzzer.

The alarm module 355 may output an alarm signal indicating the occurrence of an event in the MS 106. Examples of the event include receiving a call signal, receiving a message, and receiving a key signal. Examples of the alarm signal output by the alarm module 355 include an audio signal, a video signal, and a vibration signal.

The alarm module 355 may output a vibration signal upon receiving a call signal or a message. In addition, the alarm module 355 may receive a key signal and may output a vibration signal as feedback to the key signal.

Once a vibration signal is output by the alarm module 355, the user may recognize that an event has occurred. A signal for notifying the user of the occurrence of an event may be output by the display module 351 or the audio output module 353.

The memory 360 may store various programs necessary for the operation of the controller 380. In addition, the memory 360 may temporarily store various data such as a phonebook, messages, still images, or moving images.

The memory 360 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The MS 106 may operate a web storage, which performs the functions of the memory 360 on the Internet.

The interface unit 370 may interface with an external device that can be connected to the MS 106. The interface unit 370 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 370 may receive data from an external device or may be powered by an external device. The interface unit 370 may transmit data provided by an external device to other components in the MS 106 or may transmit data provided by other components in the MS 106 to an external device.

The controller 380 may control the general operation of the MS 106. For example, the controller 380 may perform various control operations regarding making/receiving a voice call, transmitting/receiving data, or making/receiving a video call.

The controller 380 may include a multimedia play module 381, which plays multimedia data. The multimedia play module 381 may be implemented as a hardware device and may be installed in the controller 380. Alternatively, the multimedia play module 381 may be implemented as a software program.

The power supply unit 390 is supplied with power by an external power source or an internal power source and supplies power to other components in the MS 106.

Referring back to FIG. 1, each MS can be a member of one or more MS groups (MSGs). For example, MS 106a, MS 106b, and MS 106c maintain three separate MS groups, such as MSG1, MSG2, and MSG3, respectively. As illustrated, however, depending on the geographic location and proximity of the MSs 106a, 106b, and 106c with respect to one another, the MSs may be located within the perimeter of a single MSG such as MSG2.

For example, the BS 102 and the RS 104 may receive MSG information of each MS via an MSG report. Typically, the MSG information provided by an MS in the MSG report includes a group of neighboring MSs from which the MS is capable of successfully receiving uplink transmissions. The MSG information of the MS may be received periodically or repeatedly, as described below.

In one embodiment, the MSG information of one MS may be received asynchronously with respect to the MSG information received from other MSs. For example, if the MS 106b is able to receive an MSG report from the MS 106a, the MS 106b can include the MS 106a in the next MSG report provided by the MS 106b.

In accordance with one embodiment, the MSG information of an MS may affect the transmission scheduling of the BS 102 or RS 104 because the scheduler of the BS 102 or RS 104 may prefer to pair an uplink (UL) transmission from an MS in an MSG where the BS 102 has a scheduled downlink transmission to take advantage of the benefits of network coding.

It is noted, however, that access link network coding often requires each MS in the communication system 100 to receive the UL resource assignments of neighboring MSs as determined, for example, by the RS 104. Moreover, access link network coding may also require each MS to be notified of the MSG reporting assignments of other MSs. As such, each MS may monitor additional identifiers (IDs) of other MSs.

In one embodiment, the UL resource assignment of a neighboring MS, which is also referred to as a uni-cast control information message, can be included in an encoded message which is transmitted by the RS 104 to an intended MS.

For example, the UL resource assignment can be included in an information element (IE) and the RS 104 can generate a cyclic redundancy check (CRC) based on the IE. Thereafter, the IE and CRC can each be scrambled using one or more scrambling sequences specific to the ID of the intended receiver. For example, the IE can be scrambled using a first scrambling sequence ($S_1$) based on the ID of the intended MS to generate a scrambled IE ($IE_S$) and the CRC can be scrambled using a second scrambling sequence ($S_2$) based on the ID of the intended MS to generate a scrambled CRC ($CRC_S$).

The RS 104 can then encode the $IE_S$ and the $CRC_S$ into a single message. For example, the RS 104 can concatenate the $IE_S$ and the $CRC_S$ to generate the concatenated message $IE_S|CRC_S$, where the symbol "|" indicates concatenation. The RS 104 can then transmit the concatenated message $IE_S|CRC_S$ to the intended MS.

Typically, for an MS to decode an encoded message that includes a UL resource assignment of other MSs, that is, the message $IE_S|CRC_S$, the MS generates $S_1$ and $S_2$ based on an MS ID, for each MS ID in an array of MS IDs. The MS then descrambles the message $IE_S|CRC_S$ using $S_1$ and $S_2$ to generate the message IE|CRC. The MS then generates a CRC based on the IE, that is, CRC(IE) and compares the CRC to the CRC(IE). Therefore, the MS detects the MS ID if the CRC(IE) matches the CRC. This procedure is repeated for each MS ID.

In one embodiment, an MS, such as MS 106a in MSG1, can be configured to receive and decode an encoded message that includes a UL resource assignment of other MSs located in the MSG of the MS, such as MS 106b in MSG1.

For example, for each $MS_i$ in the MSG of the MS 106a, the MS 106a can generate a first $MS_i$ scrambling sequence ($S_{1i}$) and a second $MS_i$ scrambling sequence ($S_{2i}$) based on the ID of the $MS_i$ in the MSG. For example, the MS 106a can generate $S_{1i}$ and $S_{2i}$ based on the ID of MS 106b, since MS 106b is in the MSG of the MS 106a, that is, MSG1. In one embodiment, $S_{1i}$ and $S_{2i}$ can be generated by the MS 106a during a period when the MS 106a is offline.

The MS 106a can then perform a CRC operation on $S_{1i}$ and can perform an exclusive or (xor) operation on the result of the CRC operation and $S_{2i}$ to generate a first code ($C_i$) for each $MS_i$, as shown in equation 1. In one embodiment, each determined $C_i$ may be stored in a list in the MS 106a. The MS 106a can then associate the scrambling sequence $S_{1i}$ with the corresponding $C_i$.

$$C_i = CRC(S_{1i}) \otimes S_{2i} \quad \text{(equation 1)}$$

After receiving the message $IE_S|CRC_S$ intended for another MS, the MS 106a can decode the user specific control channel (USCCH) IE of another MS. For example, the MS 106a can perform a CRC operation on the $IE_S$ and can perform an exclusive or operation on the result of the CRC operation and the $CRC_S$ to generate a second code ($C_X$) as shown in equation 2.

$$C_X = CRC(IE_S) \otimes CRC_S \quad \text{(equation 2)}$$

The MS 106a then proceed to determine whether $C_X$ matches $C_i$. If $C_X$ matches $C_i$, then MS 106a uses the $S_{1i}$ corresponding to the code $C_i$ to descramble the $IE_S$. It should be noted that the techniques described herein involve a comparable amount of processing to conventional techniques where the MS ID is explicitly provided in the IE.

As explained below, CRC operations can be represented using polynomials. When polynomials are used, the coefficient of each order can correspond to the bit value of the order. Accordingly, a series of bits in a bit stream can be mapped to the coefficients in a polynomial to generate a polynomial representation of the bit stream. Therefore, for convenience of explanation and unless specified otherwise, it should be understood that the polynomials herein described using functional notation, such as $f(x)$, are generated based on polynomial representations of bit streams.

For example, the CRC described above can be generated according to equation 3:

$$m(x)x^L = q(x)g(x) + p(x) \quad \text{(equation 3)}$$
$$\rightarrow b(x) = m(x)x^L - p(x)$$
$$= m(x)x^L + p(x)$$
$$= q(x)g(x)$$

where the function g(x) is a polynomial representation of a CRC generator, the function m(x) is a polynomial representation of the message, the function p(x) is a polynomial representation of the attached CRC, and the function b(x) is a polynomial representation of the transmitted signal. For example, the function m(x) can be a $k^{th}$ order function, the function p(x) can be an $L^{th}$ order function, and the function b(x) can be an $n^{th}$ order function, where n=k+L.

For example, a scrambling sequence based on an ID of an $MS_i$ can be generated according to equation 4:

$$S^i(x) = S_m^i(x)x^L + S_p^i(x) \quad \text{(equation 4)}$$

where the function $S^i(x)$ is the total scrambling sequence, the function $S_m^i(x)$ is the scrambling sequence for the message, and the function $S_p{}^i(x)$ is the scrambling sequence for the CRC. For example, the function $S_m{}^i(x)$ can be a $k^{th}$ order function, the function $S_p{}^i(x)$ can be an $L^{th}$ order function, and the function $S^i(x)$ can be an $n^{th}$ order function, where n=k+L.

For example, after appending the CRC to the message, the signal to be transmitted can be represented by equation 5:

$$b(x)=m(x)x^L+p(x)=q(x)g(x) \qquad \text{(equation 5)}$$

The signal to be transmitted can then be scrambled using the function $S^i(x)$ described above according to equation 6:

$$\begin{aligned} b^i(x) &= s^i(x) \otimes b(x) \\ &= s_m^i(x)x^L \otimes m(x)x^L + s_p^i(x) \otimes p(x) \\ &= s^i(x) \otimes q(x)g(x) \end{aligned} \qquad \text{(equation 6)}$$

The signal received by an MS can be represented by the function r(x), assuming that the signal is received without any errors, as shown in equation 7:

$$\begin{aligned} r(x) &= b^i(x) \\ &= s^i(x) \otimes b(x) \\ &= s_m^i(x)x^L \otimes m(x)x^L + s_p^i(x) \otimes p(x) \\ &= s^i(x) \otimes q(x)g(x) \end{aligned} \qquad \text{(equation 7)}$$

The determination of the CRC based on the message portion of the signal received by the MS can be performed with the function g(x) described above according to equation 8:

$$\begin{aligned} CRC_m^i &= \{s_m^i(x)x^L \otimes m(x)x^L\} \bmod g(x) \\ &= \{s_m^i(x)x^L\} \bmod g(x) \otimes \{m(x)x^L\} \bmod g(x) \\ &= \{s_m^i(x)x^L\} \bmod g(x) \otimes p(x) \end{aligned} \qquad \text{(equation 8)}$$

An exclusive or operation can then performed on the determined CRC, that is, $CRC_m{}^i$, the received CRC, that is, $CRC_s{}^i$, according to equation 9.

$$\begin{aligned} CRC_s^i &= s_p^i(x) \otimes p(x) \\ CRC_m^i \otimes CRC_s^i &= \{s_m^i(x)x^L\} \bmod g(x) \otimes p(x) \otimes s_p^i(x) \otimes p(x) \\ &= \{s_m^i(x)x^L\} \bmod g(x) \otimes s_p^i(x) \end{aligned} \qquad \text{(equation 9)}$$

It should be noted that since the expression:

$$\{s_m{}^i(x)x^L\} \bmod g(x) \otimes s_p{}^i(x)$$

of equation 9 depends solely on the MS ID and not data, the expression indicates the MS ID. It is understood that the symbol "$\otimes$" is used to symbolize a logical exclusive OR operation. In one embodiment, the BS 102 can broadcast a bitmap in a USCCH IE at a fixed position. For example, the bitmap can identify the $IE_S$ in the USCCH that a network-coding enabled MS needs to decode. With the assistance of the bitmap, a network coding-enabled MS does not need to decode the UL assignments and packet data associated with a UL packet which is not suitable for network coding, such as a UL packet from an MS that is not in any other MSG of other MSs.

The assignment of MSG reports in accordance with various embodiments of the invention will now be discussed.

MSG reporting assignments can be similar to the VoIP resource assignment but on a slower time scale. The RS 104 assigns an MS configured to perform network coding to a bit position in the bitmap. In one embodiment, the RS 104 assigns an MS to a bit position based on the filtered channel quality indicator (CQI) of the MS and pilot reports of neighboring pilots. For example, MSs having similar CQI and pilot reports are assigned to positions which are close to one another. The RS 104 broadcasts the bitmap periodically. For example, the bitmap can be broadcasted once every second in overhead messages.

For example, the BS 102 can generate a bitmap of "M" bits every second, where "M" is an integer representing the maximum number of MSs that may perform network coding per each RS. For example, if there is an "N" number of active MSs configured to perform network coding, the BS 102 can set "N" bits of the bitmap to "1." If the bit position for an MS is set to '1,' the MS determines its MSG reporting resource and timing based on the number of other preceding bit positions that are set to '1,' as shown in the next paragraph.

Figure 4:
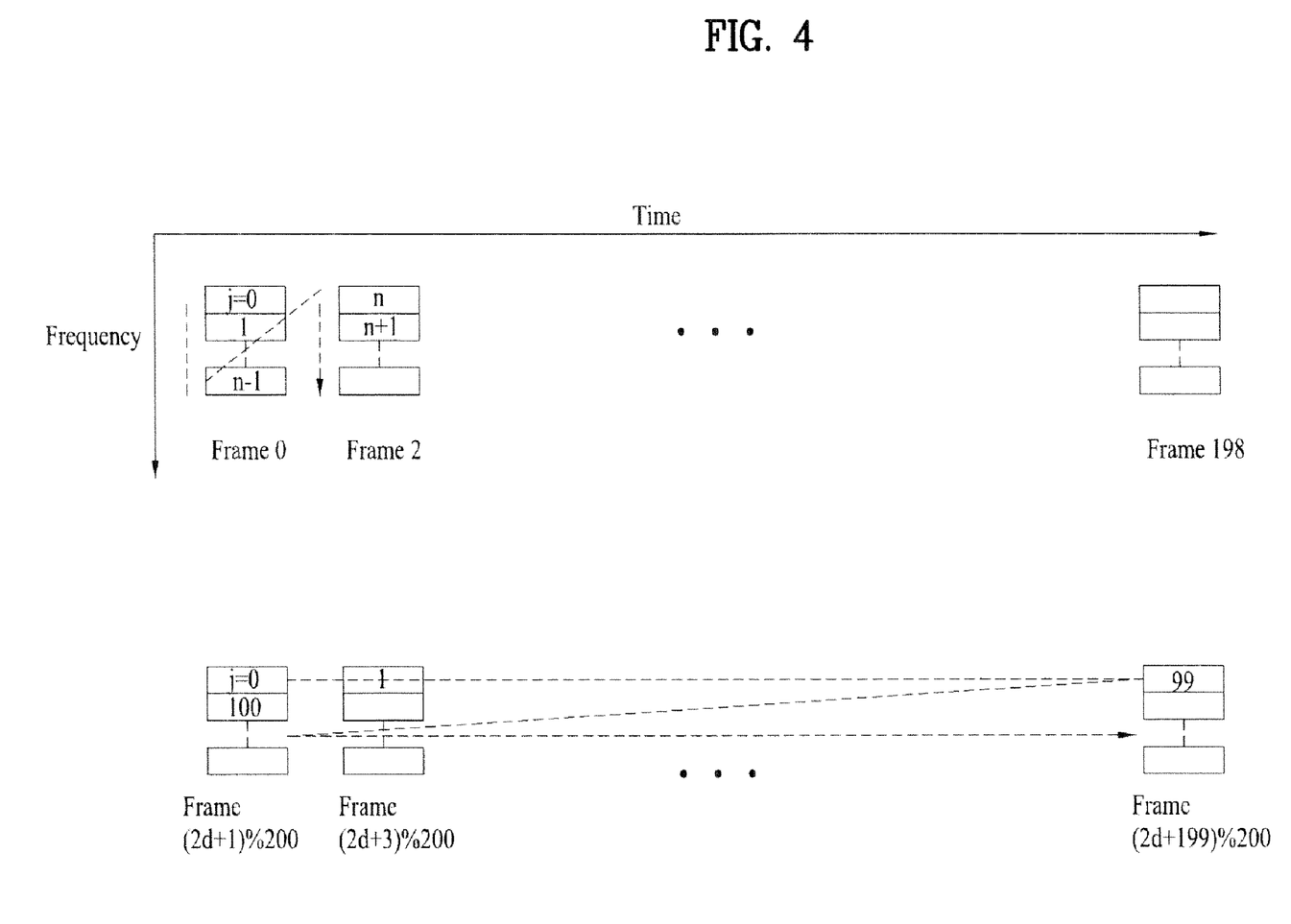
FIG. 4 illustrates an example of MSG report allocations in accordance with various embodiments of the invention.
Figure 5:
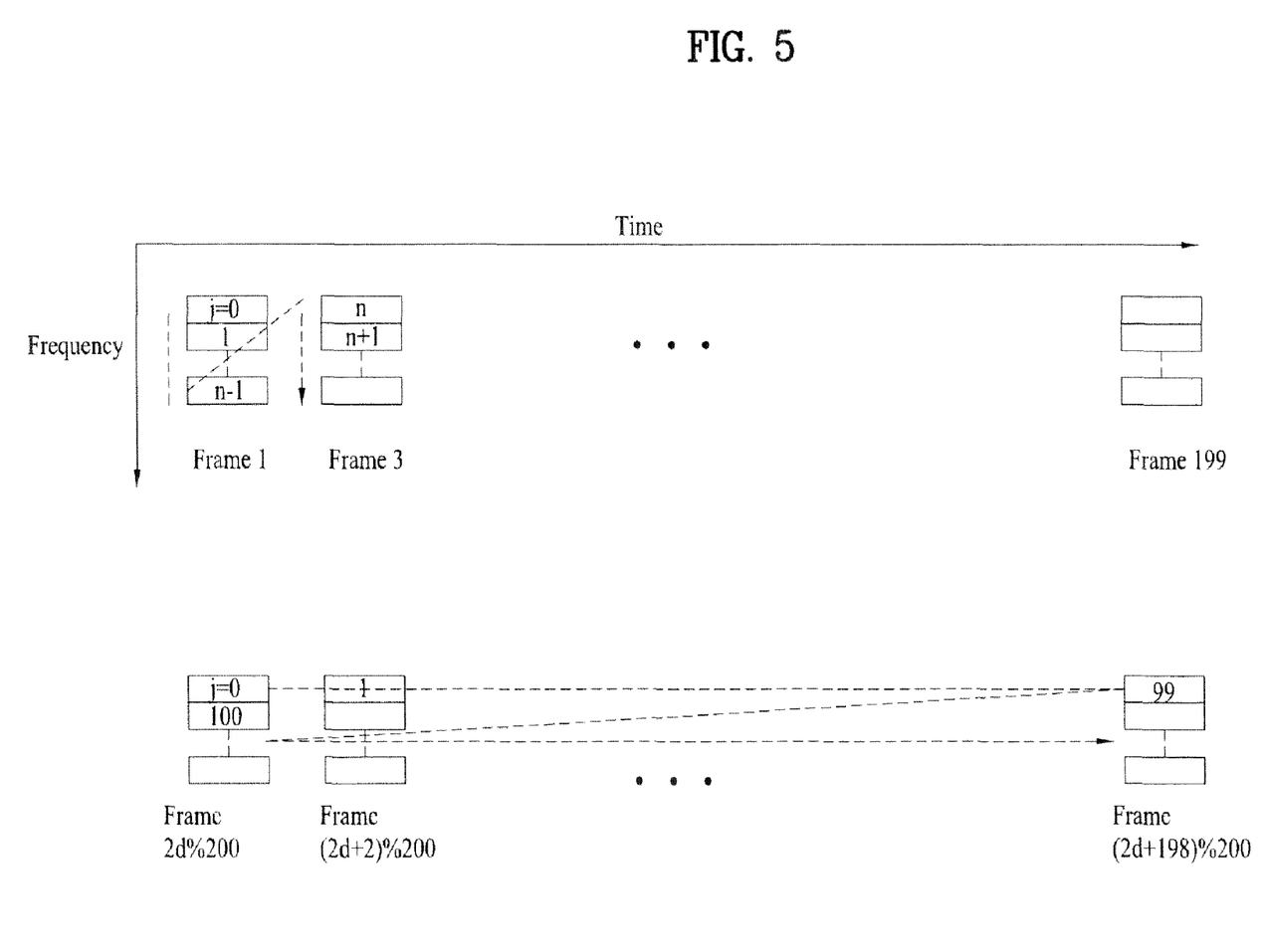
FIG. 5 illustrates an example of MSG report allocations in accordance with various embodiments of the invention.

In one embodiment, the communication system 100 enables a transmission rate of 200 radio frames per second. The RS 104 schedules $2n$ MSs to send MSG reports for every radio frame, where n=N/200. In other words, MSGs are reported twice in one second from a network-coding enabled MS. For example, the $i^{th}$ MS on the bitmap with a corresponding bit set to '1' can be denoted as $MS_{j,k}$, where j=floor(i/2) and k=i %2. An example of MSG report allocations for $MS_{j,k}$ where k=0 and k=1 are shown in FIGS. 4 and 5, respectively. In one embodiment, a fixed modulation and coding scheme (MCS) can be used for transmitting the MSG reports.

It should be noted that the sets of MSs reporting at same time as $MS_{j,k}$ are different in the two reporting opportunities for each second. This minimizes the opportunities which can prevent some neighboring MSs from being discovered by $MS_{j,k}$ due to concurrent transmissions during periods when $MS_{j,k}$ cannot hear. For example, the $MS_{j,0}$ can be scheduled for UL transmissions, such as UL packet or DL feedback, on radio frames f with f %2=0, such that the $MS_{j,0}$ can always hear from MSs with a k index value of 1. The formation of an MSG will now be discussed with reference to FIG. 1.

In one embodiment, each MS in the communication system 100, such as MS 106a, 106b, and 106c, initially transmits an MSG report indicating zero group members. Each of the MSs then proceeds to decode the MSG report transmitted by another MS. For example, if an MS is able to successfully decode the MSG report from a neighboring MS, the MS includes in its MSG the MS ID of the neighboring MS. In one embodiment, the MS ID of the neighboring MS can be included in the MSG by an indication at the appropriate bit position in the bitmap.

In one embodiment, the $i^{th}$ MS in the bitmap where k=0, that is, $MS_{j,0}$, having high UL activities may be scheduled to transmit at even frames and still be able to monitor or otherwise receive the MSG reports of N−n+1 other MSs. The MS can also monitor or receive the sounding channel of other MSs if the sounding channel assignment is based on the bitmap position. The MS transmits an updated MSG report at the scheduled opportunities.

The contents of an exemplary MSG report will now be discussed.

In one embodiment, an MSG report can include at least a bitmap index, a quality indicator, DL/UL activity indicators, a continuation indicator, or a format indicator. For example, the bit map index can identify the MSs that are in an MSG of an MS. The quality indicator can indicate the received signal strength or quality of the MSs in an MSG. The DL/UL activity indicators can indicate the DL/UL activities of the MS. The continuation indicator can be used to communicate to a BS that the MSG report is a continuation of a previous MSG report. The format indicator can indicate whether the bitmap index is based on all bits of the bitmap or only on the positions set to "1."

The size of an exemplary MSG report will now be discussed.

As discussed above, an MSG report can include at least a bitmap index, a CQI, DL/UL activity indicators, a continuation indicator, or a format indicator. For example, the size of the bit map index can be determined according to equation 10:

$$Bits_{Bitmapindex} = \log_2(C_x^m) \quad \text{(equation 10)}$$

where "m" represents the number of MS IDs out of "M" or "N" IDs which are reportable by the MS, such as MS IDs having a comparable CQI, and where "x" represents the maximum number of group members per MSG report. In one embodiment, the value of "M" or "N" depends on the format indicator.

The CQI can include 2× bits to indicate one of four levels of signal strengths corresponding to an MSG member of the MS. The DL/UL activity indicators can include 4 bits to indicate one of four levels of activities with respect to each of the DL and the UL. The continuation indicator and the format indicator can each include one bit.

Table 1 shows an exemplary MSG reporting overhead per MS.

TABLE 1

| M | m | X | frequency (Hz) | bps |
|---|---|---|---|---|
| 200 | 200 | 10 | 4 | 324 |
| 200 | 200 | 10 | 2 | 162 |
| 200 | 200 | 5 | 4 | 192 |
| 200 | 200 | 5 | 2 | 96 |
| 200 | 100 | 10 | 4 | 280 |
| 200 | 100 | 10 | 2 | 140 |
| 200 | 100 | 5 | 4 | 172 |
| 200 | 100 | 5 | 2 | 86 |
| 200 | 50 | 10 | 8 | 480 |
| 200 | 50 | 10 | 4 | 240 |
| 200 | 50 | 10 | 2 | 120 |
| 200 | 50 | 5 | 8 | 304 |
| 200 | 50 | 5 | 4 | 152 |
| 200 | 50 | 5 | 2 | 76 |

The MSs indicated in a MSG report are the MSs whose MSG can be decoded by the reporting MS since the last report from the reporting MS. If the number of decodable MSs in this reporting period is greater than a maximum x, then MS picks the ones which are favorable to itself, e.g., with greater signal strength, or DL/UL activities different from itself.

The MS maintains a set of MS IDs each of which has at least one decodable MSG report in the last t duration. These are the MS IDs to monitor for UL assignment.

Figure 6A:
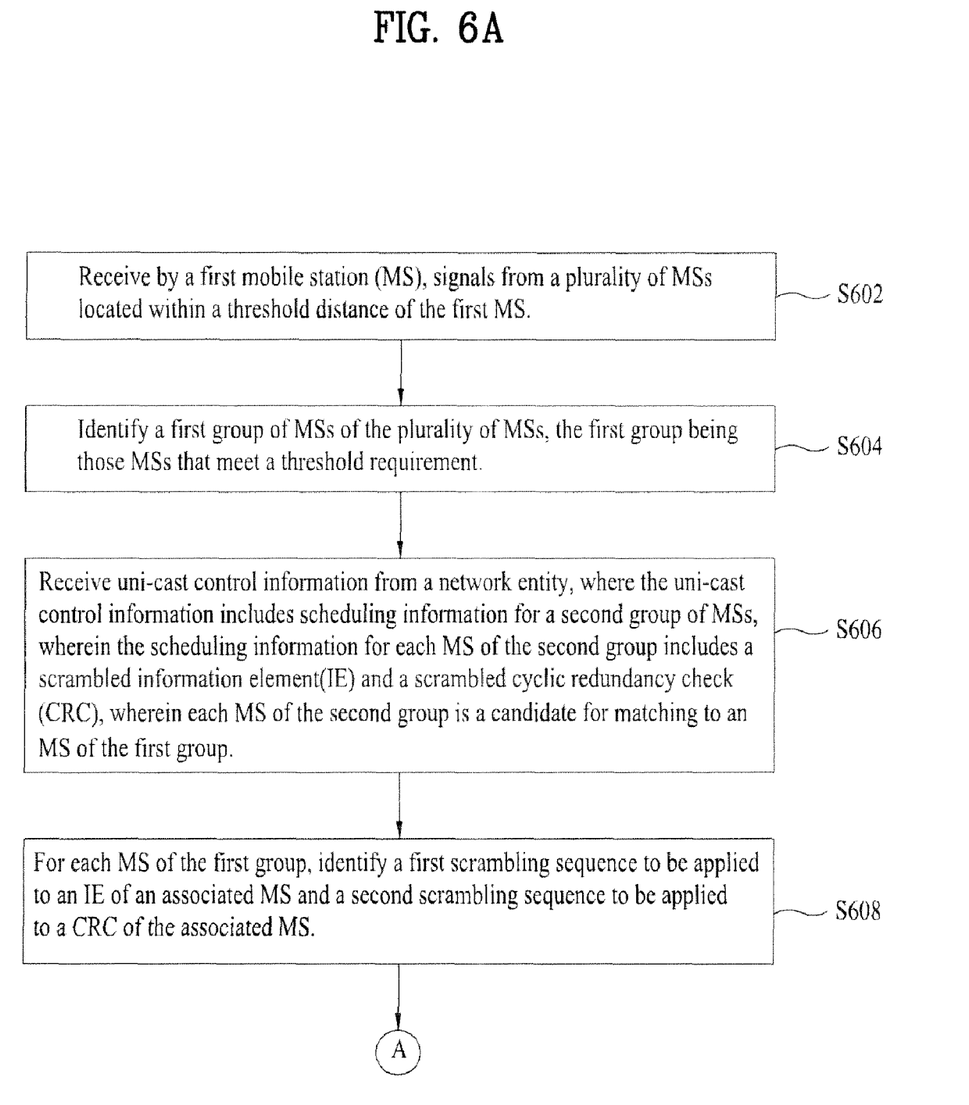
FIGS. 6A and 6B are flowcharts depicting methods for identifying matched mobile stations according to various embodiments of the present invention.
Figure 6B:
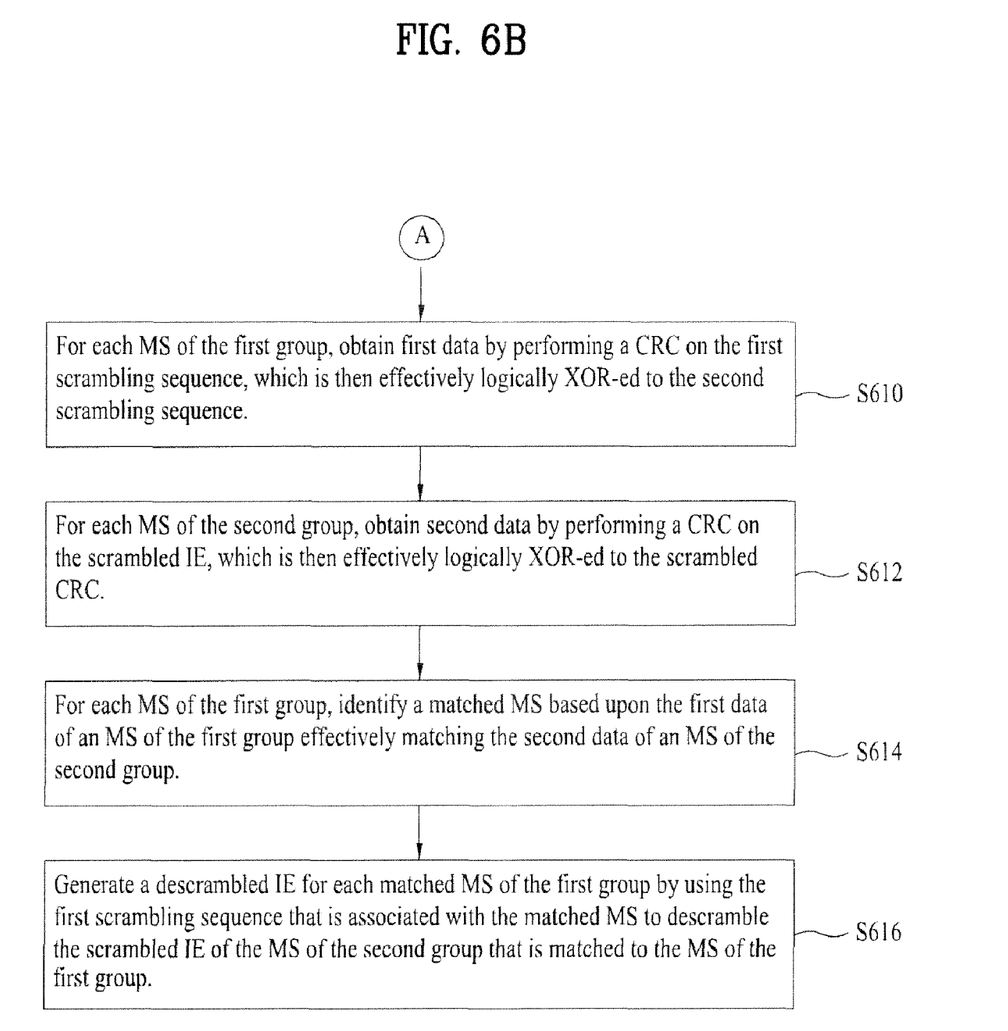

FIGS. 6A and 6B are flowcharts depicting methods for identifying matched mobile stations according to various embodiments of the present invention. As shown in FIG. 6A, the first mobile station, such as MS 106a, receives signals from a plurality of MSs, such as MS 106b, located within a threshold distance of the first MS (S602).

A first group of MSs of the plurality of MSs are identified, the first group being those MSs that meet a threshold requirement (S604). Uni-cast control information is then received from a network entity, where the uni-cast control information includes scheduling information for a second group of MSs, where the scheduling information for each MS of the second group includes a scrambled information element (IE) and a scrambled CRC, where each MS of the second group is a candidate for matching to an MS of the first group (S606).

A first scrambling sequence to be applied to an IE of an associated MS and a second scrambling sequence to be applied to a CRC of the associated MS is identified for each MS of the first group (S608). First data is obtained for each MS of the first group by performing a CRC on the first scrambling sequence, which is then effectively logically XOR-ed to the second scrambling sequence (S610). A second data is obtained for each MS of the second group by performing a CRC on the scrambled IE, which is then effectively logically XOR-ed to the scrambled CRC (S612).

A matched MS is identified for each MS of the first group based upon the first data of an MS of the first group effectively matching the second data of an MS of the second group (S614).

A descrambled IE is generated for each matched MS of the first group by using the first scrambling sequence that is associated with the matched MS to descramble the scrambled IE of the MS of the second group that is matched to the MS of the first group (S616).

In alternative implementations, certain logic operations may be performed in a different order, modified or removed and still implement preferred embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and advantages are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for identifying matched mobile stations, the method comprising:
   receiving by a first mobile station signals from a plurality of mobile stations located within a threshold distance of the first mobile station;
   identifying a first group of mobile stations of the plurality of mobile stations, the first group being those mobile stations that meet a threshold requirement;
   receiving uni-cast control information from a network entity, wherein the uni-cast control information comprises scheduling information for a second group of mobile stations, wherein the scheduling information for each mobile station of the second group comprises a scrambled information element and a scrambled cyclic redundancy check (CRC), wherein each mobile station of the second group is a candidate for matching to a mobile station of the first group;
   for each mobile station of the first group, identifying a first scrambling sequence to be applied to an information element of an associated mobile station and a second scrambling sequence to be applied to a CRC of the associated mobile station;
   for each mobile station of the first group, obtaining first data by performing a CRC on the first scrambling sequence, which is then effectively logically XOR-ed to the second scrambling sequence;
   for each mobile station of the second group, obtaining second data by performing a CRC on the scrambled information element, which is then effectively logically XOR-ed to the scrambled CRC;
   for each mobile station of the first group, identifying a matched mobile station based upon the first data of a mobile station of the first group effectively matching the second data of a mobile station of the second group; and
   generating a descrambled information element, for each matched mobile station of the first group by using the first scrambling sequence that is associated with the matched mobile station, to descramble the scrambled information element of the mobile station of the second group that is matched to the mobile station of the first group.

2. The method according to claim 1, wherein the threshold distance of the first mobile station relates to a distance at which the first mobile station is able to receive the signals from the plurality of mobile stations.

3. The method according to claim 1, wherein the threshold requirement is at least a defined signal strength, a defined signal quality or a successful decoding of an uplink packet.

4. The method according to claim 1, wherein the network entity comprises a relay station or a base station.

5. The method according to claim 1, wherein the second group of mobile stations comprises a single mobile station.

6. The method according to claim 1, wherein the second group of mobile stations comprises a plurality of mobile stations.

7. A mobile station, comprising:
   a receiver configured to receive signals from a plurality of mobile stations located within a threshold distance of the mobile station and to receive uni-cast control information from a network entity; and
   a controller configured to:
      identify a first group of mobile stations of the plurality of mobile stations, the first group being those mobile stations that meet a threshold requirement, wherein the uni-cast control information comprises scheduling information for a second group of mobile stations, wherein the scheduling information for each mobile station of the second group comprises a scrambled information element and a scrambled cyclic redundancy check (CRC), wherein each mobile station of the second group is a candidate for matching to a mobile station of the first group;
      identify for each mobile station of the first group a first scrambling sequence to be applied to an information element of an associated mobile station and a second scrambling sequence to be applied to a CRC of the associated mobile station;
      obtain for each mobile station of the first group first data by performing a CRC on the first scrambling sequence, which is then effectively logically XOR-ed to the second scrambling sequence;
      obtain for each mobile station of the second group second data by performing a CRC on the scrambled information element, which is then effectively logically XOR-ed to the scrambled CRC;
      identify for each mobile station of the first group, a matched mobile station based upon the first data of a mobile station of the first group effectively matching the second data of a mobile station of the second group; and
      generate a descrambled information element for each matched mobile station of the first group by using the first scrambling sequence that is associated with the matched mobile station to descramble the scrambled information element of the mobile station of the second group that is matched to the mobile station of the first group.

8. The mobile station according to claim 7, wherein the threshold distance of the first mobile station relates to a distance at which the mobile station is able to receive the signals of the plurality of mobile stations.

9. The mobile station according to claim 7, wherein the threshold requirement is at least a defined signal strength, a defined signal quality or a successful decoding of an uplink packet.

10. The mobile station according to claim 7, wherein the network entity comprises a relay station or a base station.

11. The mobile station according to claim 7, wherein the second group of mobile stations comprises a single mobile station.

12. The mobile station according to claim 7, wherein the second group of mobile stations comprises a plurality of mobile stations.

* * * * *